United States Patent
Hu et al.

(10) Patent No.: US 10,306,588 B2
(45) Date of Patent: *May 28, 2019

(54) ADAPTIVE CALL NOTIFICATION

(71) Applicant: Futurewei Technologies, Inc., Plano, TX (US)

(72) Inventors: Fangqi Hu, San Diego, CA (US); Tongzeng Yang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/923,579

(22) Filed: Mar. 16, 2018

(65) Prior Publication Data

US 2018/0206205 A1    Jul. 19, 2018

Related U.S. Application Data

(63) Continuation of application No. 15/187,090, filed on Jun. 20, 2016, now Pat. No. 9,936,480.

(51) Int. Cl.
| | |
|---|---|
| *H04W 68/00* | (2009.01) |
| *H04W 88/02* | (2009.01) |
| *H04L 12/58* | (2006.01) |
| *H04M 19/04* | (2006.01) |

(52) U.S. Cl.
CPC ......... *H04W 68/005* (2013.01); *H04L 51/24* (2013.01); *H04M 19/04* (2013.01); *H04W 88/02* (2013.01)

(58) Field of Classification Search
CPC ..... H04W 68/00; H04W 68/02; H04W 88/02; H04W 4/16; H04W 4/22
See application file for complete search history.

(56) References Cited

U.S. PATENT DOCUMENTS

| | | | |
|---|---|---|---|
| 6,351,639 B1* | 2/2002 | Motohashi | H04M 1/72519 379/201.02 |
| 8,285,339 B2* | 10/2012 | Shin | H04M 19/044 19/44 |
| 8,700,101 B2* | 4/2014 | Yamashita | H04M 1/0245 381/104 |
| 9,936,480 B2* | 4/2018 | Hu | H04L 51/24 |

(Continued)

FOREIGN PATENT DOCUMENTS

| | | |
|---|---|---|
| CN | 102932554 | 2/2013 |
| CN | 103002151 | 3/2013 |

(Continued)

OTHER PUBLICATIONS

"U.S. Appl. No. 15/187,090, Advisory Action dated Oct. 3, 2017", 5 pgs.

(Continued)

*Primary Examiner* — Bobbak Safaipour
(74) *Attorney, Agent, or Firm* — Schwegman Lundberg & Woessner, P.A.

(57) ABSTRACT

A method for adaptive call notification in a user equipment (UE) includes detecting an incoming call indication such as a ring signal. The ambient sound level for the UE is measured in response to the incoming call indication. A UE vibration device is activated in response to the detected incoming call indication and the ambient sound level being greater than a user-selectable threshold.

20 Claims, 4 Drawing Sheets

(56) References Cited

U.S. PATENT DOCUMENTS

| | | | | |
|---|---|---|---|---|
| 2003/0008687 | A1* | 1/2003 | Nishimura | H04M 19/044 19/44 |
| 2003/0013495 | A1* | 1/2003 | Oleksy | H04M 19/04 455/567 |
| 2005/0221809 | A1* | 10/2005 | Lin | H04M 3/54 455/418 |
| 2005/0222638 | A1* | 10/2005 | Foley | A61N 1/36007 607/40 |
| 2005/0265690 | A1* | 12/2005 | Kawasaki | H04N 7/17309 386/201 |
| 2006/0248183 | A1* | 11/2006 | Barton | H04L 51/24 709/224 |
| 2008/0304647 | A1* | 12/2008 | Ikemori | H04M 3/38 379/207.02 |
| 2009/0051509 | A1* | 2/2009 | Hwang | H04B 1/3888 340/407.2 |
| 2010/0056226 | A1* | 3/2010 | Bansal | H04M 1/72519 455/567 |
| 2010/0081481 | A1* | 4/2010 | Hirokawa | H04M 1/0245 455/567 |
| 2010/0295678 | A1 | 11/2010 | Suzuki et al. | |
| 2012/0231849 | A1* | 9/2012 | Yamashita | H04M 1/0245 455/566 |
| 2013/0006404 | A1* | 1/2013 | Pitkanen | G06F 3/165 700/94 |
| 2013/0324071 | A1* | 12/2013 | Huh | H04M 3/02 455/404.1 |
| 2015/0005039 | A1* | 1/2015 | Liu | H04M 1/72569 455/567 |
| 2015/0358520 | A1* | 12/2015 | Thimmappa | H04N 5/2256 348/217.1 |
| 2016/0205267 | A1* | 7/2016 | Vaughn | H04M 19/04 455/566 |
| 2017/0054837 | A1* | 2/2017 | Choi | H04W 4/16 |
| 2017/0367068 | A1* | 12/2017 | Hu | H04L 51/24 |

FOREIGN PATENT DOCUMENTS

| | | |
|---|---|---|
| CN | 104104775 | 10/2014 |
| CN | 105376418 | 3/2016 |

OTHER PUBLICATIONS

"U.S. Appl. No. 15/187,090, Final Office Action dated Jul. 13, 2017", 14 pgs.

"U.S. Appl. No. 15/187,090, Non Final Office Action dated Jan. 12, 2017", 13 pgs.

"U.S. Appl. No. 15/187,090, Notice of Allowance dated Nov. 22, 2017", 12 pgs.

"U.S. Appl. No. 15/187,090, PTO Response to Rule 312 Communication dated Mar. 7, 2018", 2 pgs.

"U.S. Appl. No. 15/187,090, Response filed Mar. 30, 2017 to Non Final Office Action dated Jan. 12, 2017", 8 pgs.

"U.S. Appl. No. 15/187,090, Response filed Sep. 12, 2017 to Final Office Action dated Jul. 13, 2017", 11 pgs.

"U.S. Appl. No. 15/187,090, Response filed Oct. 9, 2017 to Advisory Action dated Oct. 3, 2017", 10 pgs.

"International Application No. PCT/CN2017/087103, International Search Report and Written Opinion dated Jul. 27, 2017", (dated Jul. 27, 2017), 11 pgs.

U.S. Appl. No. 15/187,090, filed Jun. 20, 2016, Adaptive Call Notification.

* cited by examiner

ADAPTIVE CALL NOTIFICATION

PRIORITY CLAIM

This application is a continuation of and claims benefit of U.S. patent application Ser. No. 15/187,090, filed on Jun. 20, 2016, and entitled "Adaptive Call Notification," the content of which is hereby incorporated by reference in its entirety.

TECHNICAL FIELD

The present application is generally related to incoming call notification and more particularly to adaptive call notification.

BACKGROUND

A user is typically able to set their mobile telephone to generate an aural tone or tones to announce an incoming call, vibrate only, or generate both the aural tone and the vibration simultaneously. However, the vibration may not always be necessary or desirable.

Mobile telephone manufacturers are constantly trying to reduce power consumption of their devices in order to extend battery life. Since a vibration device in a mobile telephone consumes power when active, it would be desirable to reduce the amount of use of the vibration device.

SUMMARY

According to one aspect of the present disclosure, there is provided method for adaptive call notification in user equipment (UE), the method comprising: counting incoming ring signals in response to an incoming call to the UE; obtaining an ambient sound level for the UE; and activating a vibration device of the UE responsive to the ring signals and in response to a count of the ring signals being greater than a predetermined number and the ambient sound level being greater than a threshold sound level.

Optionally, in the preceding aspect, activating the vibration device of the UE further comprises activating the vibration device of the UE in response to an incoming call notification being activated on the UE.

Optionally, in any of the preceding aspects, the method further comprises deactivating the vibration device of the UE after a predetermined number of vibration activations.

Optionally, in any of the preceding aspects, activating the vibration device of the UE comprises applying an electrical pulse to the vibration device of the UE wherein the pulse comprises a pulse width that defines a time period during which the vibration device of the UE is activated.

Optionally, in any of the preceding aspects, activating the vibration device of the UE comprises applying the electrical pulse having a voltage level that defines an intensity of vibrations of the vibration device of the UE.

Optionally, in any of the preceding aspects, the method further comprises receiving a selection of the voltage level prior to the incoming call.

Optionally, in any of the preceding aspects, the method further comprises receiving a selection of the threshold sound level prior to the incoming call.

Optionally, in any of the preceding aspects, the method further comprises receiving a selection of the predetermined number prior to the incoming call.

According to another aspect of the present disclosure, there is provided a user equipment (UE) comprising: a vibration device configured to vibrate a case of the UE in response to an electrical pulse signal; an aural device configured to provide a signal representing an ambient sound level for the UE; and a controller coupled to the vibration device and the aural device, the controller being configured to: count incoming ring signals in response to an incoming call; and apply the electrical pulses to the vibration device in response to respective ones of the ring signals and in response to a count of the ring signals being greater than a predetermined number and the ambient sound level being greater than a threshold sound level.

Optionally, in the preceding aspect, the controller is further configured to apply the electrical pulse signal to the vibration device in response incoming call notification being activated on the UE.

Optionally, in any of the preceding aspects, the controller is further configured to: receive a user selected percentage of battery life; and apply the electrical pulse signal to the vibration device in response to a battery of the UE having a remaining battery life greater than the user selected percentage of battery life.

Optionally, in any of the preceding aspects, the controller is further configured to stop applying the electrical pulses to the vibration device after applying a predetermined number of electrical pulses have been applied.

Optionally, in any of the preceding aspects, the electrical pulses applied by the controller each has a pulse width that defines a time period that the vibration device of the UE is activated for each ring signal of the respective ring signals.

Optionally, in any of the preceding aspects, the controller is further configured to generate the electrical pulse signal to have a voltage level that defines an intensity of vibration of the vibration device.

Optionally, in any of the preceding aspects, the controller is further configured to: implement a user interface; and to determine the voltage level of the electrical pulse signal based on a selection received from the user interface.

According to another aspect of the present disclosure, there is provided a non-transitory computer-readable storage medium that stores instructions for execution by processing circuitry of a user equipment (UE), the instructions configuring the UE to: count incoming ring signals in response to an incoming call to the UE; obtain an ambient sound level for the UE; and activate a vibration device of the UE in response to the ring signals and in response to a count of the ring signals being greater than a predetermined number and the ambient sound level being greater than a threshold sound level.

Optionally, in the preceding aspect, the instructions further configure the UE to: implement a user interface for the UE, the user interface including selections for the threshold sound level, a vibration intensity, and the predetermined number.

Optionally, in any of the preceding aspects, the user interface includes a first line having a first icon representing the threshold sound level and a second line having a second icon representing the vibration intensity and the instructions further configure the UE to determine the threshold sound level and the vibration intensity based on respective positions of the first and second icons on the first and second lines.

Optionally, in any of the preceding aspects, the instructions further configure the UE to activate the vibration device in response to an incoming call notification being activated on the UE.

Optionally, in any of the preceding aspects, the instructions further configure the UE to: receive a user selected percentage of battery life; and activate the vibration device in response to a battery of the UE having a remaining battery life greater than the user selected percentage of battery life.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
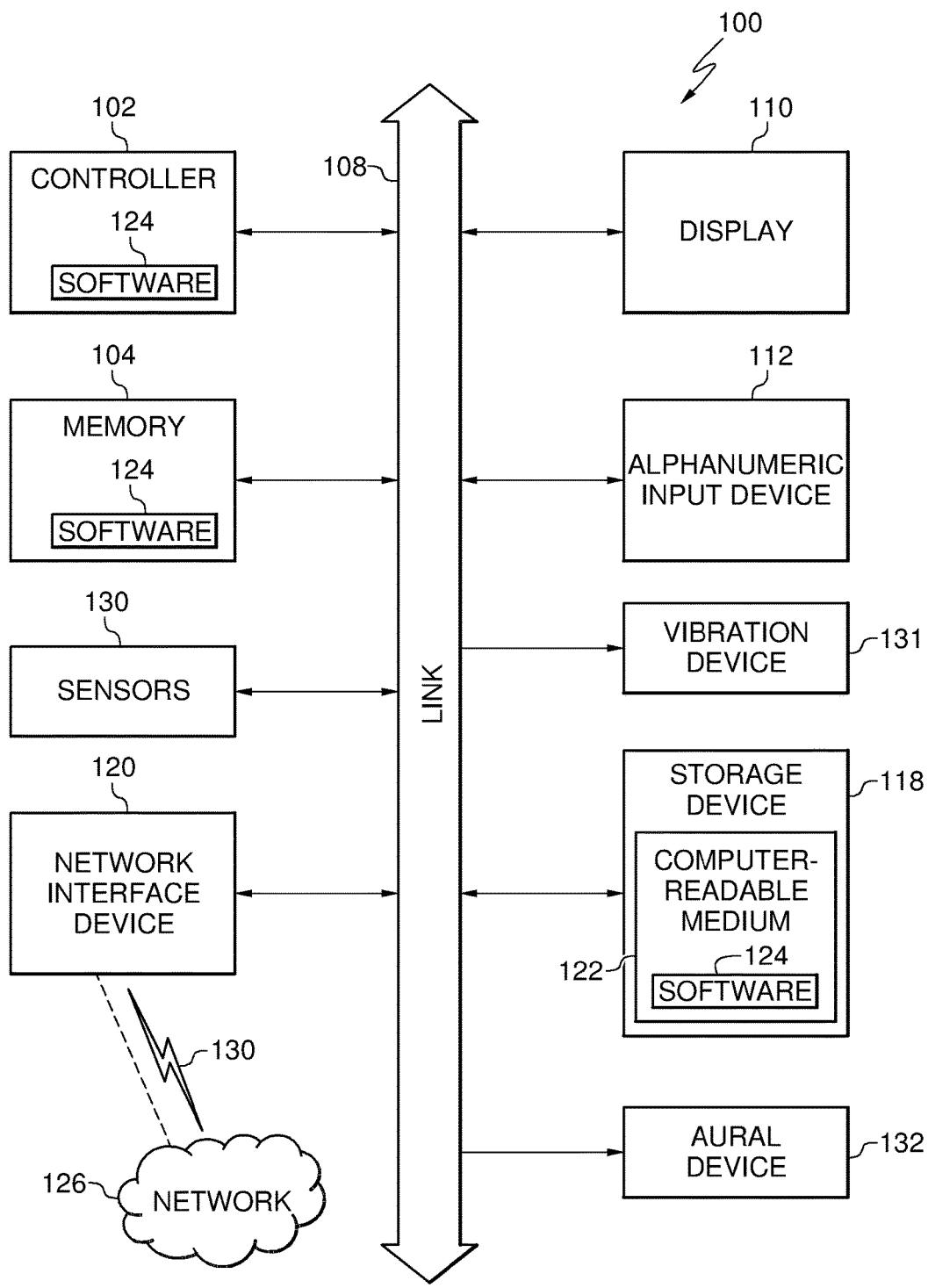
FIG. 1 is a block diagram of a communication device, in accordance with various embodiments.

FIG. 1 is a block diagram of a communication device 100, in accordance with various embodiments. The block diagram of FIG. 1 is for purposes of illustration only as any communication device, wireless or wireline, may use the method for adaptive call notification.

The wireless communication device 100 (i.e., user equipment (UE)) may be in the example form of a wireless communication device. For example, the UE 100 may be a mobile telephone (i.e., cell telephone), a landline telephone, a computer, a personal computer (PC), a tablet computer, a hybrid tablet, a personal digital assistant (PDA), or part of any device configured to execute instructions (sequential or otherwise) that specify actions to be taken by the wireless communication device 100. Subsequent user of the phrase "user equipment" or "UE" may be defined to encompass any of the above-described communication devices as well as any other communication device, wireless or wireline, that may use the adaptive call notification method described herein.

The UE 100 may include at least one controller 102 (e.g., a central processing unit (CPU), a graphics processing unit (GPU) or both, processor cores, compute nodes, etc.), and memory 104 that communicate with each other via a link 108 (e.g., bus). The UE 100 may further include a display 110 (e.g., video, LED, LCD) and an alphanumeric input device 112 (e.g., a keypad, keyboard) coupled to the link 108. In one embodiment, the display device 110 and the alphanumeric input device 112 may be combined into one unit as a touch screen display.

The UE 100 may additionally include a network interface device 120 coupled to the link 108. The network interface device 120 may include one or more radios (e.g., transmitters and receivers (transceivers), modulators, demodulators) coupled to one or more antenna elements in order to communicate over a wireless network channel 130 to a network 126, as illustrated in FIG. 1. The one or more radios may be configured to operate using one or more communication techniques including code division multiple access (CDMA) or global system for mobile communications (GSM). The network interface device 120 may also include a wired network interface (e.g., X2 backhaul link) for communicating over a wireline channel 130 with the network 126.

A storage device 116 (e.g., a drive unit, hard disk drive, solid state drive, optical drive) may be coupled to the link 108 and include a non-transitory computer-readable storage medium 122 on which is stored one or more sets of data structures and instructions 124 (e.g., software) embodying or utilized by any one or more of the methodologies or functions described herein. The instructions 124 may also reside, completely or at least partially, within the memory 104 and/or within the controller 102 during execution thereof by the UE 100.

While the non-transitory computer-readable storage medium 122 is illustrated in an example embodiment to be a single medium, the term "computer-readable medium" may include a single medium or multiple media (e.g., a centralized or distributed database, and/or associated caches and servers) that store the one or more instructions 124.

The UE 100 may additionally include sensors 130 coupled to the link 108. The sensors 130 may include an accelerometer, a global positioning system (GPS) receiver, a gyroscope, temperature, barometer, photocell, and/or a compass to provide sensory input to the controller 102. These sensors 130 may be used to determine a velocity (i.e., magnitude and direction) of the UE 100.

The UE 100 additionally includes an aural device 132. The aural device 132 represents a microphone, a speaker, a headphone connector, and/or some other way of detecting or producing sound from the UE 100. The aural device 132 block may represent a speaker for producing a notification sound (e.g., tones, songs) or a received signal representing one side of a conversation. The aural device 132 may additionally represent a microphone for detecting ambient sound levels around the UE 100.

The UE 100 additionally includes a vibration device 131. The vibration device 131 may be any device configured to produce a vibration of a case (not shown) enclosing the UE 100 in order to signal an alert to a user. The alert may include an incoming call notification or some other alert. An example of one vibration device 131 is illustrated in FIG. 2.

Both the aural device and the vibration device 131 are shown coupled to the link 108 for purposes of illustration only. These devices 131, 132 may be hardwired to the controller 102 or some other circuit of the UE 100 in order for the controller 102 to control their operation or receive signals.

Figure 2:
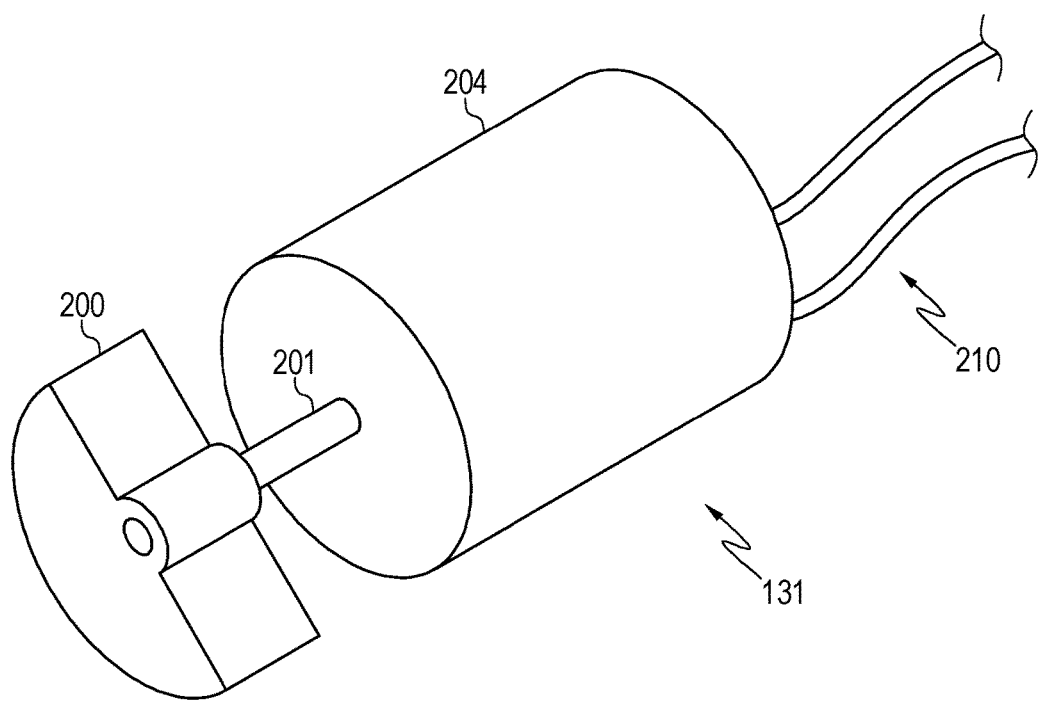
FIG. 2 is a diagram of a vibration device, in accordance with various embodiments.

FIG. 2 is a diagram of a vibration device 131, in accordance with various embodiments. The vibration device 131 shown in FIG. 2 is for purposes of illustration only as other vibration devices may be used.

The illustrated vibration device 131 includes a weight 200 coupled to an electric motor 204 (e.g., brushless) through a spindle 201. While the weight 200 is shown having a half circle shape, the weight 200 may be any shape that produces an off-balance effect when the electric motor 204 rotates the spindle 201 with the attached weight 200. The off-balance effect results in the vibration of the UE case. Power (e.g., voltage pulses) may be applied to activate the motor 204 through wire connections 210 to the controller 102.

Figure 3:
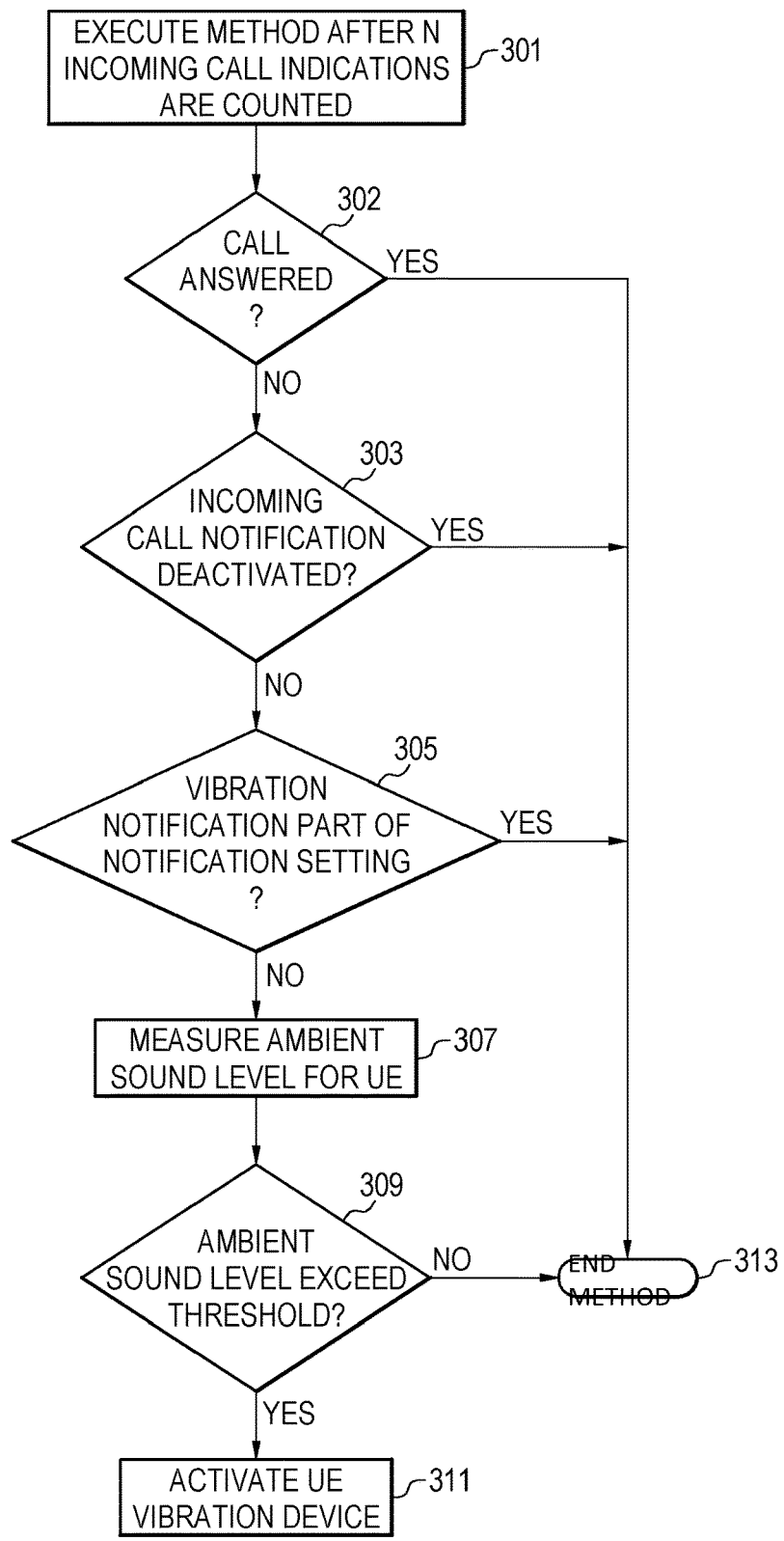
FIG. 3 is a flowchart of a method for adaptive call notification, in accordance with various embodiments.

In operation, when a vibration notification is to be sent to the user in response to some event (e.g., call notification), the controller 102 detects the received call and, according to the method illustrated in FIG. 3, controls voltage pulses to the motor 204 through the wire connections 210. The rotation of the unbalanced weight 200 then vibrates the UE case to alert the user. The width of the voltage pulses may define a time period that the vibration device is active.

FIG. 3 is a flowchart of a method for adaptive call notification, in accordance with various embodiments. In block 301, the method for adaptive call notification is executed after a certain number of incoming call indications (e.g., 4) have been counted at the beginning of a call. The incoming call indications may be the ring signals from a base station or wireline switching office to the UE as an indication of an incoming call to the UE. The count may be determined by counting the consecutive incoming call indications beginning from the first call indication from the base station and prior to the incoming call being answered. In block 302, if it is determined that the incoming call has been answered, the counting stops and the method ends at block 313. If the call is not answered, the method continues to block 303.

In block 303, it is determined if the incoming call notification function has been deactivated. If this function has been deactivated, the method ends at block 313 since the user has decided not to accept any incoming call notifications. In this case, the method refrains from activating (i.e., does not activate) the UE vibration device in response to the detected incoming call indication and the ambient sound level. In other words, the UE vibration is not activated in response to any incoming call notifications. If the incoming call notification has not been deactivated (i.e., incoming call notification activated), the method continues to block 305.

In block 305, it is determined if the vibration notification is part of the notification settings. If so, then the method ends at block 313 since the vibration device is already vibrating to announce the incoming call. If the vibration notification is not part of the notification settings, the method continues to block 307.

In block 307, the ambient sound levels for the UE are measured. In an embodiment, this may be accomplished by the aural device 132 (e.g., microphone) of the UE as illustrated in FIG. 1. The ambient sound levels may be expressed in decibels (dB) or as a binary number representative of sound levels, such as decibels.

In block 309, the measured ambient sound level is compared to a sound threshold. The sound threshold may be user-selectable as discussed subsequently with reference to FIG. 4. If the measured ambient sound level is greater than or equal to the sound threshold (e.g., >75 dB), the UE vibration device is activated in block 311. The vibration device may be activated by voltage pulses applied to the device as controlled by the UE controller. The UE vibration device is then deactivated after a predetermined number of vibration activations.

If the measured ambient sound level is less than the sound threshold, there is no need to activate the UE vibration device and the method ends in block 313. In this case, the ambient sound levels have not reach the user-selectable threshold where the user believes the vibrations would be useful or desired.

Figure 4:
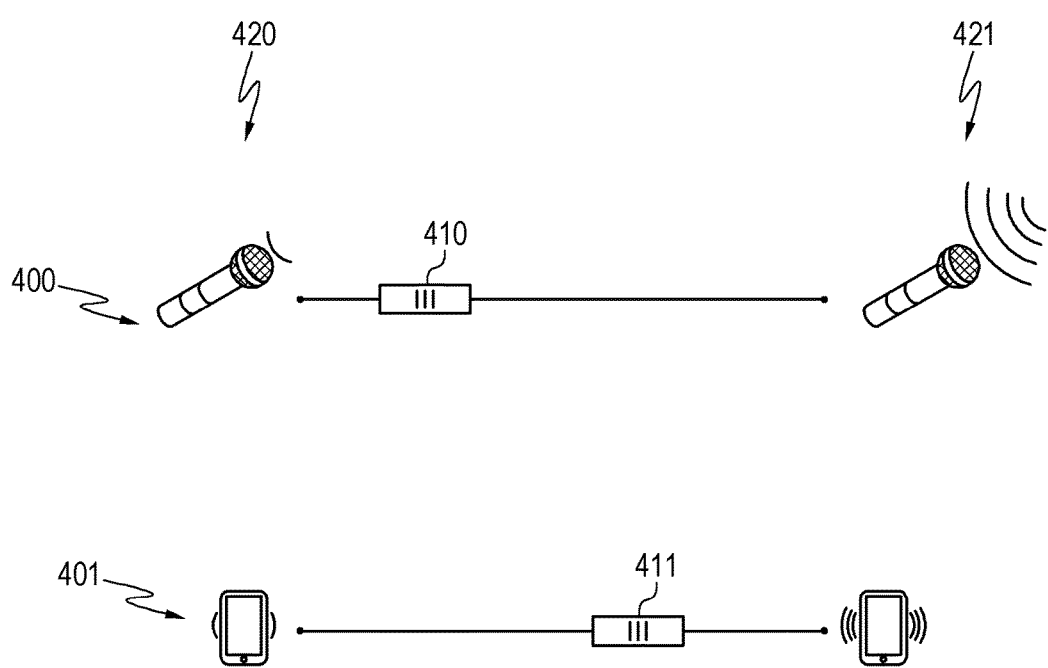
FIG. 4 is a diagram of a display for user-selectable functions, in accordance with the various embodiments.

FIG. 4 is a diagram of a display for user-selectable functions, in accordance with the various embodiments. Such a function display may be implemented on a touch-screen display of a smartphone or using sliding hardware switches. These function icons or switches are only for purposes of illustration as these functions may be selected in other ways.

One such user-selectable function 400 includes a user-selectable sound threshold function 400 for the measured ambient sound, as measured by the aural device 132 of FIG. 1. Since different people have different hearing levels due to age, genetics, and/or disease, each user of a UE may use the ambient sound threshold user-selectable function 400 to select a threshold level (e.g., measured in decibels) at which the above-described vibration device is activated for adaptive call notification. The user may adjust the sound level threshold of this function 400 by touching the icon 410 for the switch (or the actual switch on a hardware device), and dragging the icon or switch 410 to the left 420 for a lower threshold or to the right 421 for a higher threshold. The ambient sound threshold may thus be variable between these two extremes 420, 421 as determined by the controller reading the position of the icon or switch relative to the two extremes 420, 421.

Another user-selectable function 401 includes a user-selectable vibration intensity function 401. In some situations, even the sound of the UE case vibrating may be detectable by others. Thus, if the user is expecting to be in such a situation, the user may adjust the vibration intensity by touching the function icon 411 (or switch) and dragging the icon or switch 411 to the left 420 for a lower vibration intensity or to the right 421 for a higher vibration intensity. The vibration intensity may thus be variable between these two extremes 420, 421 as determined by the controller reading the position of the icon or the switch relative to the two extremes 420, 421. The change in vibration intensity may be accomplished by applying a larger voltage to the vibration device for a higher intensity and a lower voltage for a lower intensity.

Another user-selectable function includes a user-selectable disablement of the vibration function if the battery voltage level or percentage of battery life remaining gets down to a predetermined or user-selectable level. For example, the user may select that at 30% of battery life remaining, the vibration function is disabled no matter what the ambient noise levels.

Another user-selectable function includes a user setting for each contact stored in the UE that enables or disables the vibration function for each contact, regardless of the ambient noise setting. For example, a user may regard some of her contacts as being less important and disables the vibration function for that particular contact.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a computer. For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

The Abstract is provided with the understanding that it will not be used to limit or interpret the scope or meaning of the claims. The following claims are hereby incorporated into the detailed description, with each claim standing on its own as a separate embodiment.

What is claimed is:

1. A method for adaptive call notification in user equipment (UE), the method comprising:
counting incoming ring signals in response to an incoming call to the UE;
obtaining an ambient sound level for the UE; and
activating a vibration device of the UE responsive to the ring signals and in response to a count of the ring signals being greater than a predetermined number and the ambient sound level being greater than a threshold sound level.

2. The method of claim 1, wherein activating the vibration device of the UE further comprises activating the vibration device of the UE in response to an incoming call notification being activated on the UE.

3. The method of claim 1, further comprising deactivating the vibration device the UE after a predetermined number of vibration activations.

4. The method of claim 1, wherein activating the vibration device of the UE comprises applying an electrical pulse to the vibration device of the UE wherein the pulse comprises a pulse width that defines a time period during which the vibration device of the UE is activated.

5. The method of claim 4, wherein activating the vibration device of the UE comprises applying the electrical pulse having a voltage level that defines an intensity of vibrations of the vibration device of the UE.

6. The method of claim 5, further comprising receiving a selection of the voltage level prior to the incoming call.

7. The method of claim 1, further comprising receiving a selection of the threshold sound level prior to the incoming call.

8. The method of claim 1, further comprising receiving a selection of the predetermined number prior to the incoming call.

9. A user equipment (UE) comprising:
a vibration device configured to vibrate a case of the UE in response to an electrical pulse signal;
an aural device configured to provide a signal representing an ambient sound level for the UE; and
a controller coupled to the vibration device and the aural device, the controller being configured to:
count incoming ring signals in response to an incoming call; and
apply the electrical pulses to the vibration device in response to respective ones of the ring signals and in response to a count of the ring signals being greater than a predetermined number and the ambient sound level being greater than a threshold sound level.

10. The UE of claim 9, wherein the controller is configured to apply the electrical pulse signal to the vibration device in response incoming call notification being activated on the UE.

11. The UE of claim 9, wherein the controller is configured to:
receive a user selected percentage of battery life; and
apply the electrical pulse signal to the vibration device in response to a battery of the UE having a remaining battery life greater than the user selected percentage of battery life.

12. The UE of claim 9, wherein the controller is configured to stop applying the electrical pulses to the vibration device after applying a predetermined number of electrical pulses have been applied.

13. The UE of claim 12, wherein the electrical pulses applied by the controller each has a pulse width that defines a time period that the vibration device of the UE is activated for each ring signal of the respective ring signals.

14. The UE of claim 9, wherein the controller is configured to generate the electrical pulse signal to have a voltage level that defines an intensity of vibration of the vibration device.

15. The UE of claim 14, wherein the controller is configured to:
implement a user interface; and
to determine the voltage level of the electrical pulse signal based on a selection received from the user interface.

16. A non-transitory computer-readable storage medium that stores instructions for execution by processing circuitry of a user equipment (UE), the instructions configuring the UE to:
count incoming ring signals in response to an incoming call to the UE;
obtain an ambient sound level for the UE; and
activate a vibration device of the UE in response to the ring signals and in response to a count of the ring signals being greater than a predetermined number and the ambient sound level being greater than a threshold sound level.

17. The non-transitory computer-readable storage medium of claim 16, wherein the instructions further configure the UE to:
implement a user interface for the UE, the user interface including selections for the threshold sound level, a vibration intensity, and the predetermined number.

18. The non-transitory computer-readable storage medium of claim 17, wherein the user interface includes a first line having a first icon representing the threshold sound level and a second line having a second icon representing the vibration intensity and the instructions further configure the UE to determine the threshold sound level and the vibration intensity based on respective positions of the first and second icons on the first and second lines.

19. The non-transitory computer-readable storage medium of claim 16, wherein the instructions further configure the UE to activate the vibration device in response to an incoming call notification being activated on the UE.

20. The non-transitory computer-readable storage medium of claim 16, wherein the instructions further configure the UE to:
receive a user selected percentage of battery life; and
activate the vibration device in response to a battery of the having a remaining battery life greater than the user selected percentage of battery life.

* * * * *